United States Patent
Mayo

(10) Patent No.: US 9,668,462 B1
(45) Date of Patent: Jun. 6, 2017

(54) FISH STRINGER

(71) Applicant: Ron D. Mayo, Guthrie, OK (US)

(72) Inventor: Ron D. Mayo, Guthrie, OK (US)

(*) Notice: Subject to any disclaimer, the term of this patent is extended or adjusted under 35 U.S.C. 154(b) by 0 days.

(21) Appl. No.: 15/227,677

(22) Filed: Aug. 3, 2016

Related U.S. Application Data

(60) Provisional application No. 62/219,758, filed on Sep. 17, 2015.

(51) Int. Cl.
*A01K 65/00* (2006.01)

(52) U.S. Cl.
CPC .................................. *A01K 65/00* (2013.01)

(58) Field of Classification Search
CPC ..................................................... A01K 65/00
USPC .............................................. 224/103; 43/55
See application file for complete search history.

(56) References Cited

U.S. PATENT DOCUMENTS

| | | | | |
|---|---|---|---|---|
| 529,758 A * | 11/1894 | Sippy | ..................... | A01K 65/00 224/103 |
| 2,453,381 A * | 11/1948 | Orton | ..................... | A01K 65/00 224/103 |
| 2,455,766 A * | 12/1948 | Harvey | .................. | A01K 65/00 224/103 |
| 2,563,480 A * | 8/1951 | Montgomery | ......... | A01K 65/00 224/103 |
| 2,564,389 A * | 8/1951 | Boehm | .................. | A01K 65/00 188/67 |
| 3,332,121 A | 7/1967 | Curtis | | |
| 3,540,637 A * | 11/1970 | Robins | .................... | A01K 65/00 224/103 |
| 3,806,860 A * | 4/1974 | Flammini | ............... | F16G 11/10 439/817 |
| 4,570,836 A | 2/1986 | Mayo | | |
| 4,735,202 A | 4/1988 | Williams | | |
| 4,932,940 A | 6/1990 | Walker et al. | | |
| 5,078,310 A * | 1/1992 | Ferry | ..................... | A01K 65/00 224/103 |
| 5,104,385 A | 4/1992 | Huband | | |
| 5,254,100 A | 10/1993 | Huband | | |
| 5,472,430 A | 12/1995 | Vaillancourt et al. | | |
| 6,183,446 B1 | 2/2001 | Jeanbourquin | | |
| 6,926,696 B2 | 8/2005 | Mohammed | | |
| 7,028,798 B2 | 4/2006 | Castellon | | |
| 7,357,282 B2 * | 4/2008 | Brull | ..................... | A01K 65/00 224/103 |
| 8,167,897 B2 | 5/2012 | Muto et al. | | |

(Continued)

FOREIGN PATENT DOCUMENTS

FR    2861167 A1    4/2005

*Primary Examiner* — Justin Larson
(74) *Attorney, Agent, or Firm* — Mary M. Lee

(57) ABSTRACT

A fish stringer. The device comprises a rope with a spear on one end and a tie-off loop on the other end. A tubular casing is included for sheathing the spear in a safety position when not in use. The locking assembly includes a J-shaped slot in the side of the casing that receives a knob on the side of the spear. A biasing member, such as a spring inside the casing urges the spear into the locked position to prevent accidental removal of the spear from the casing. After the first caught fish is speared, the spear is threaded through the tie-off loop. There is no need to tie off the rest of the fish in the string, making the stringing of the rest of the caught fish faster and easier.

3 Claims, 3 Drawing Sheets

(56) References Cited

U.S. PATENT DOCUMENTS

| | | | |
|---|---|---|---|
| 8,714,420 B2 * | 5/2014 | Dickey | A01K 65/00 224/103 |
| 2015/0040465 A1 * | 2/2015 | Nelson | A01K 65/00 43/55 |

* cited by examiner

FISH STRINGER

FIELD OF THE INVENTION

The present invention relates to the sport of fishing generally and, more particularly but without limitation, to devices for stringing caught fish.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate preferred embodiments of the invention and are not to be construed as limiting the scope of the invention.

DETAILED DESCRIPTION OF THE PREFERRED EMBODIMENT(S)

Figure 1:
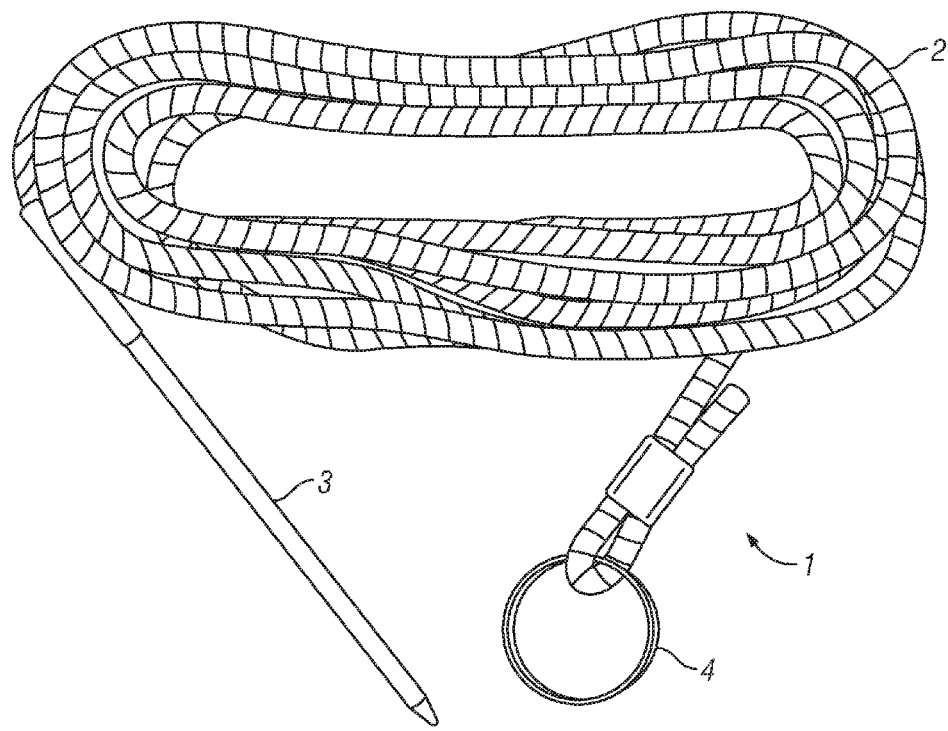
FIG. 1 is a plan view of a prior art rope or spear-type fish stringer.

Fish stringers are commonly use by fishermen for holding caught fish submerged in the water during a fishing "outing" to keep the fish alive until the fisherman is ready to move the fish to more permanent storage or to prepare the fish for eating. A rope stringer is the simplest type of fish stringer. Shown in FIG. 1 is a conventional rope stringer 1. It comprises a line of wire, rope, or cord 2 with a stringing needle or spear 3 at one end. A loop or ring 4 usually is secured at the other end; the loop can be used to secure the stringer to the fisherman's belt, belt loop, tackle box, or some other item. Using the spear 3, the cord 2 is threaded through the fish gill in a known manner.

Figure 2:
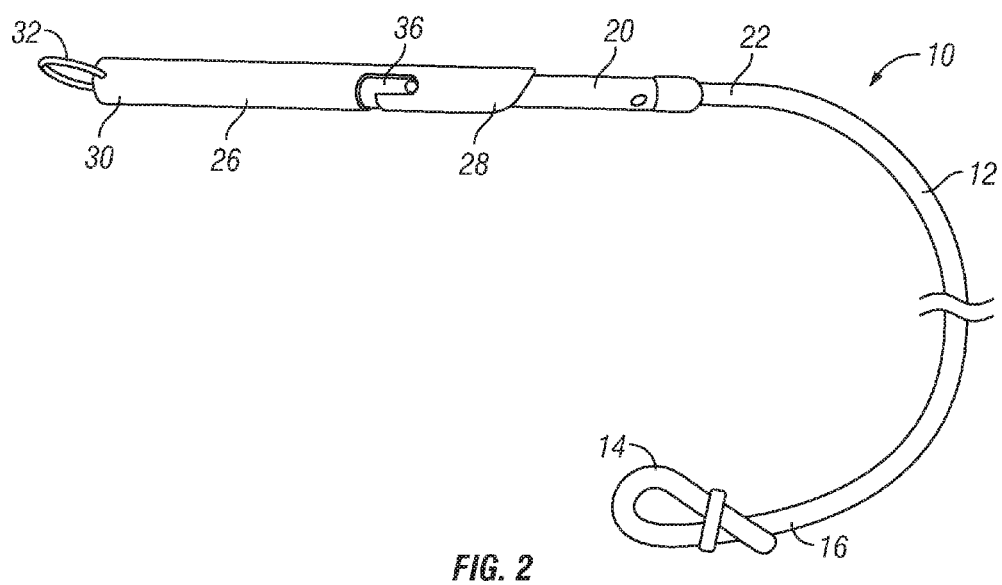
FIG. 2 is a plan view of a fish stringer in accordance with a preferred embodiment of the present invention.
Figure 3:
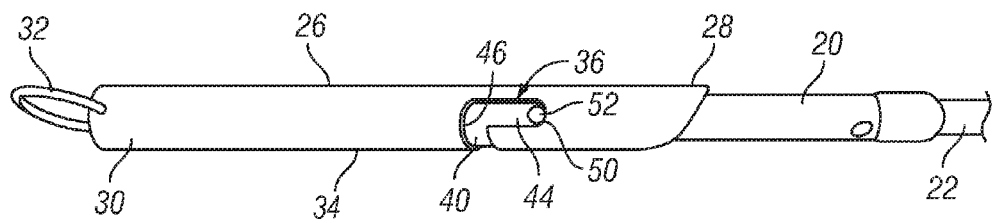
FIG. 3 is an enlarged plan view of the inventive fish stringer showing the spear locked into the spear housing.
Figure 4:
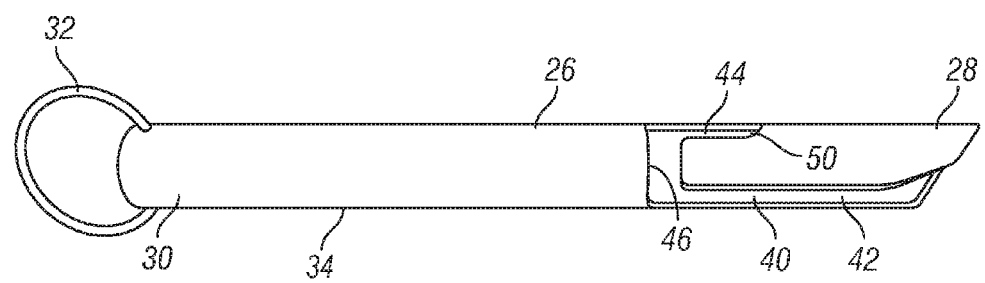
FIG. 4 is a plan view of the spear housing showing the J-shaped slot in the side of the housing.
Figure 5:
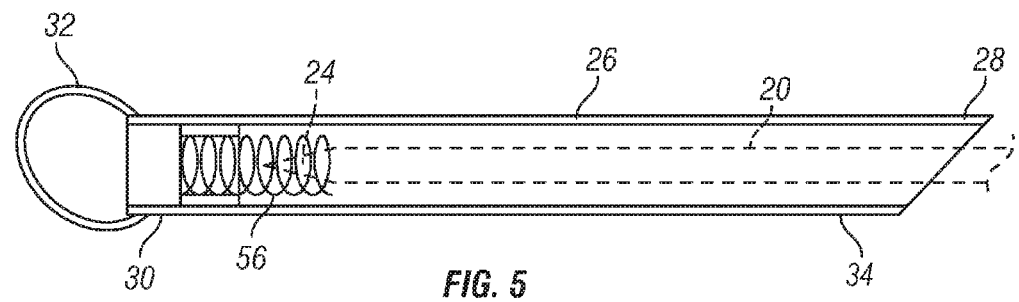
FIG. 5 is a longitudinal sectional view of the spear housing shown in FIG. 4 showing the internal spring.

Turning now to the drawings in general and to FIG. 2 in particular, there is shown therein a fish stringer constructed in accordance with a particularly preferred embodiment of the present invention. The fish stringer, designated generally by the reference number 10, comprises a length of wire, rope, or cord 12 with a tie-off loop 14 formed on one end 16. The loop 14 may be formed by simply folding the end 16 back upon itself and securing this with a clamp or tie of some sort. Alternately, the loop may be a ring of metal or plastic attached to the end 16.

Figure 6:
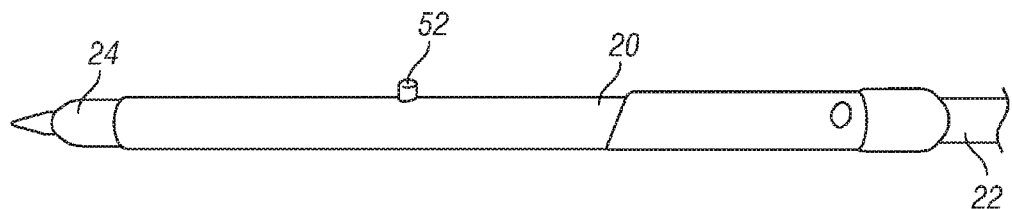
FIG. 6 is a side elevational view of the spear.
Figure 7:
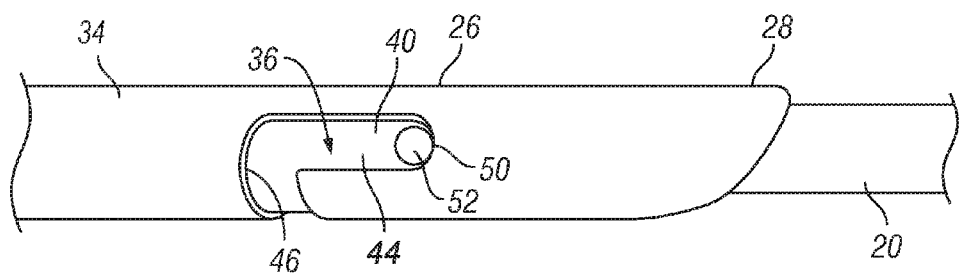
FIG. 7 is an enlarged plan view of the spear locked into the spear housing showing the tab locked into the end of the J-shaped slot.
Figure 8:
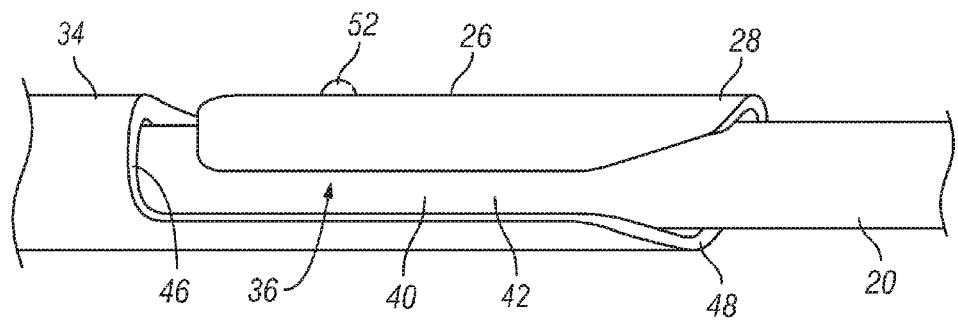
FIG. 8 is an enlarged side elevational view of the spear locked into the spear housing showing the tab locked into the end of the slot.

The fish stringer 10 further comprises a needle or spear 20 secured to the opposite end 22 of the rope 12. The spear 20 is an elongate member formed of a relatively rigid material and having a pointed end 24 (FIG. 6) adapted to efficiently pierce the fish as they are added to the string.

Still further, and referring now also to FIGS. 3-8, the fish stringer 10 includes a tubular sheath or casing 26 adapted to receive the spear 20. The casing 26 has one open end 28 for inserting the spear 20. The opposite end 30 may be provided with a loop, hook, or ring 32, which can be used to attach the stringer 10 to the user's belt, belt loop, tackle box, or other object. The casing 26 may be opaque or transparent, and may be formed of plastic or metal or any suitable material. In the preferred practice, the casing 26 is cylindrical, that is, circular in cross-section. However, the casing 26 may have other cross-sectional shapes, such as square or hexagonal.

The fish stringer 10 includes a locking assembly for removably securing the spear 20 inside the casing 26 in a safety position. The locking assembly, designated generally at 36, may comprise a J-shaped slot 40 formed in the sidewall 34 of the casing 26. The slot 40 has two generally parallel legs, a first longer leg 42 and a second shorter leg 44 joined by a connecting section 46. The slot 40 begins at a first end 48 at the free end of the first leg 42 (the top of the "J") that opens at the end 28 of the casing 26. The second, blind end 50 terminates in the sidewall 34 a distance from the end 28 of the casing 26.

A knob 52 is provided on the side of the spear 20 and is positioned to be received in the first end 48 of the slot 40 as the spear is inserted into the casing 26. The connecting section 46 of the slot 40 (the bottom of the "J") guides the knob 52 as the spear 20 is rotated slightly and follows the slot to the blind end 50. In this position, the spear 20 is prevented from being withdrawn from the casing 26 inadvertently.

The locking assembly 36 may also include a biasing member for resiliently urging the spear 20 toward the end 28 so that the knob 52 is retained in the blind end 50. An ideal biasing member is a spring, such as a helical or coil spring 56, seen only in FIG. 5, which may be secured at or near the second end 30 of the casing 26. Thus, to lock the spear 20 in the casing 26, the pointed end 24 of the spear is inserted into the open end 28 of the casing and advanced until the knob 52 engages the connecting section 46 of the slot 40 partially compressing the spring 56. When pressure on the spear 20 is released, the spring 56 will push the spear back until the knob 52 engages the second blind end 50 of the slot 40. The spear 20 is removed from the safety position by pushing inwardly and turning it counter-clockwise until the spring 56 urges the spear out of the casing 26, the knob 52 guided by the first leg 42. At which point, the spear 20 clears the casing 26 for use.

Having described a preferred structure for the fish stringer, its use now will be explained. When the first fish of the day is caught, the spear 20 is removed from the casing 26 and is pushed through the fish's gill. Then, the spear 20 is threaded through the tie-off loop 14 on the end 16 of the rope 12. This secures the first fish on the end of the rope. Then, the spear 20 is reinserted into the casing 26. As additional fish are caught, each is added to the string by simply removing the spear 20 from the casing 26, piercing the fish, and reinserting the spear into the casing. Notably, there is no need to tie off the spear after each additional fish is added to the string. This is a significant convenience, especially for wading fishermen, float tube fishermen, and small boat fishermen.

Now the various advantageous features of the present invention will be apparent. The device is small, lightweight, and easy to handle. As mentioned above, only the first fish on the string needs to be tied-off. The operation of the device is virtually silent; no noise is caused that will disturb fish in the surrounding water. When the spear 20 is locked inside the casing 26 in the safety position, the pointed end 24 of the spear is protected to prevent injury. When not in use, the fish stringer 10 fits easily in the tray of a tackle box.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A fish stringer for collecting caught fish, the stringer comprising:
    a rope;
    a tie-off loop on one end of the rope;
    a spear on the other end of the rope, wherein the spear has a pointed end;
    a tubular casing configured to receive the spear, the casing having an open end and a closed end;
    wherein the spear is movable between a safety position and a stringing position, wherein in the stringing position the spear is free of the tubular casing for piercing the caught fish, and wherein in the safety position the pointed end is enclosed in the casing; and
    a locking assembly configured to removably secure the spear in the safety position inside the casing, wherein the locking assembly comprises:
        a J-shaped slot in the sidewall of the casing, the slot having an open end and a closed end;
        a knob on the side of the spear sized to be received in the slot;
        wherein the spear is in the safety position when the knob is in the closed end of the slot; and
        a biasing member configured to urge the knob into the closed end of the slot.

2. The fish stringer of claim 1 further comprising an attachment member on the closed end of the casing.

3. The fish stringer of claim 2 wherein the attachment member is a hook, or a loop, or a ring.

* * * * *